(12) United States Patent
Auger

(10) Patent No.: US 6,905,520 B2
(45) Date of Patent: Jun. 14, 2005

(54) MINERAL STAINS FOR WOOD AND OTHER SUBSTRATES

(75) Inventor: Stephen B. Auger, Santa Fe, NM (US)

(73) Assignee: Stain, Inc., Malibu, CA (US)

( * ) Notice: Subject to any disclaimer, the term of this patent is extended or adjusted under 35 U.S.C. 154(b) by 0 days.

(21) Appl. No.: 09/932,976

(22) Filed: Aug. 21, 2001

(65) Prior Publication Data

US 2002/0004951 A1 Jan. 17, 2002

Related U.S. Application Data

(62) Division of application No. 08/865,419, filed on May 28, 1997.

(51) Int. Cl.⁷ .................................................. D06P 3/60
(52) U.S. Cl. ........................ 8/402; 8/111; 8/623; 8/624; 8/626; 8/627; 8/637.1
(58) Field of Search ............................ 8/402, 622–629, 8/111, 637.1, 107

(56) References Cited

U.S. PATENT DOCUMENTS

| 3,554,785 A | * | 1/1971 | Dombay ................... 427/419.1 |
| 4,313,976 A | | 2/1982 | Leach .......................... 427/297 |
| 4,322,211 A | | 3/1982 | Hoyle et al. .................... 8/402 |
| 4,379,073 A | | 4/1983 | Zimmerman .................... 8/402 |
| 4,402,788 A | | 9/1983 | Paulose et al. ............... 162/78 |
| RE31,576 E | | 5/1984 | Hilditch ........................ 424/141 |
| 4,532,161 A | | 7/1985 | Collins et al. ............... 427/440 |
| 4,622,248 A | | 11/1986 | Leach et al. ................. 427/440 |
| 4,737,154 A | | 4/1988 | Gaines et al. ................... 8/402 |
| 4,752,297 A | | 6/1988 | Leach ............................ 8/402 |
| 4,937,143 A | | 6/1990 | West ........................ 427/419.8 |
| 5,051,283 A | | 9/1991 | Beane et al. ................. 427/440 |
| 5,089,342 A | | 2/1992 | Dhein et al. ................. 428/413 |
| 5,116,408 A | | 5/1992 | Crozer ......................... 106/19 |
| 5,171,328 A | | 12/1992 | Trauth et al. ................... 8/402 |
| 5,242,464 A | * | 9/1993 | Armstrong et al. ............. 8/402 |
| 5,512,323 A | | 4/1996 | Beane et al. ................. 427/408 |
| 5,525,123 A | * | 6/1996 | Lorenz et al. .................. 8/408 |

FOREIGN PATENT DOCUMENTS

| CZ | CS 145495 | * | 12/1971 |
| CZ | CS 145494 | * | 11/1972 |
| JP | 0250906 | * | 5/1984 |
| JP | 60-250906 | * | 12/1985 |
| JP | 61-32704 | * | 2/1986 |

* cited by examiner

Primary Examiner—Margaret Einsmann
(74) Attorney, Agent, or Firm—McDermott Will & Emery LLP

(57) ABSTRACT

According to the invention, a metal salt and an oxygen source are applied to penetrate or impregnate a suitable substrate sequentially in effective amounts so as to react in contact with the substrate and produce a mineral compound fixed within the surface of the substrate. The inventive combination of a mutually compatible metal salt, oxygen source, and substrate brings about an in situ reaction, and modifies the substrate to bring about a lasting desired effect. The mineral compound that is produced according to the invention is linked to the substrate, is stable and long-lasting or permanent, and is immobilized or insolubilized in the substrate. The mineral compound is bound or contained within and on the surface of the substrate, so it may be said to be ingrained in the fibers or matrix of the substrate, or embedded within the substrate. The desired effect is preferably a color. A wide variety of metal salts may be used depending on the desired effect. The oxygen source is preferably a peroxide, and the substrate is preferably a cellulose product such as wood, cotton, or paper; leather; or masonry. The invention contemplates methods of treating substrates, treatment kits, and treated products. With wood products, the invention provides a water-based stain of low toxicity useful for soft woods.

23 Claims, No Drawings

MINERAL STAINS FOR WOOD AND OTHER SUBSTRATES

This application is a division of application Ser. No. 08/865,419 filed May 28, 1997.

BACKGROUND OF THE INVENTION

This invention relates to a water-based mineral stain for wood and other substrates. More specifically, the invention relates to a process in which a metal salt and an oxygen source react with the substrate to provide a stable color or other desired effect such as preserving the substrate.

Many commercial stains readily available on the market are oil or solvent-based and/or contain hazardous chemicals subject to increasing environmental regulation and health concerns. There is a growing need for water-based colorants and finishes that contain no hazardous chemicals. Federal and state initiatives are leading to bans on stains using volatile organic compounds (e.g. petroleum, mineral spirits, toluene, or benzene).

Most water-based products for coloring and finishing wood and other materials are primarily based upon a pigment or dye suspended in a binder such as acrylic resin, which is spread onto the wood surface and held in place by the binder. Such products, although less toxic, exacerbate a problem of all conventional stains, namely that while coloring a wood such as pine they sink in more deeply into the soft pulp and are repelled by the harder wood around the annual growth rings formed during the dormant period in a tree's growing season. For example, stains such as Minwax™ can color pine to a maple-like general color, but in doing so emphasize the distinctive grain-markings characteristic of pine. Such products tend to produce marginal results and an uneven staining pattern. There would be great advantages for a stain capable of coloring both hard and soft woods evenly allowing for a maple-like overall color with a much more subtle grain pattern, thereby allowing a soft wood to mimic the appearance of a hard wood more effectively. Also, water-based stains tend to raise wood grain, requiring additional sanding.

There is a need for a coloring process having the environmental benefit of allowing rapidly growing, sustainably harvestable woods such as pine and other fast-growing and therefore "renewable" wood resources to give the visual appearance of endangered hardwoods such as mahogany, ebony, redwood, and other species that are increasingly rare and expensive.

The construction, furniture, and woodworking industries need new improved water-based stains effective for soft woods. Likewise, there is a need for environmentally beneficial coloring processes for wood products such as paper and cardboard, for fabrics for clothing and upholstery, and for manufactured polymer products.

Conventional stains take a relatively long time to dry and can only be applied in temperatures at or above 55 degrees F. There is a need for a stain that can be applied outside this range, for example, for exterior woodwork in a colder climate.

Conventional stains are made up of a binder and a pigment or dye. Many of these coloring agents are "fugitive," fading over time, especially in exterior settings. A stable coloring agent that is permanent and does not fade over time and even becomes richer and slightly darker would be an improvement over conventional stains.

Conventional stains can be used on dry, cured wood only. There is a need for stains that can be applied to damp or "green" un-cured wood. Conventional stains coat the surface of aromatic woods such as cedar, preventing the natural aroma from being released by the wood. There are advantages to stains that leave a wood fully aromatic. Oil-based conventional stains can be difficult to over-coat with water-based acrylic finishes. A stain that can be over-coated with any type of oil or water-based finish would have pronounced advantages.

Stains used to simulate wood aging, such as Cabot Stains Bleaching Oil (TM) can only be used for exterior use and the appearance of aging of the wood takes many months from application. An aging treatment that can be used indoors and occurs immediately has clear advantages. Other aging processes require the use of harsh acids, bleaches and other toxic chemicals and require complex manual wood-distressing techniques such as multiple layering of different stains to mimic grain patterns of aged wood. Preferable would be an aging treatment that is non-toxic and can be applied easily by a layman.

Some coloring processes have been developed to compensate for the unattractive green color of CCA (copper-chromium-arsenic) pressure-treated preserved lumber, such as Leach, U.S. Pat. Nos. 4,752,297 and 4,313,976. These processes rely on organic acids and other organic compounds. They are concerned primarily with preservation of wood, are able to produce only a limited color palate, and are not of general applicability.

A process of using an aqueous solution of an alkaline earth metal base to treat wood is described in Gaines et al. U.S. Pat. No. 4,757,154. This method requires immersing wood at high temperature and pressure and sanding to remove an unattractive deposit, so it is not a viable method for staining wood. Some woodworkers soak wood in a solution of iron-rich fertilizer to produce a dusty gray tone. The coloring is unstable, uneven, fades over time, leaches out if exposed to moisture, and if overcoated creates an unattractive residue, so it is not in regular use.

SUMMARY OF THE INVENTION

According to the invention, a metal salt and an oxygen source are applied to penetrate or impregnate a suitable substrate sequentially in effective amounts so as to react in contact with the substrate and produce a mineral compound fixed within the surface of the substrate. The inventive combination of a mutually compatible metal salt, oxygen source, and substrate brings about an in situ reaction, and modifies the substrate to bring about a lasting desired effect. The mineral compound that is produced according to the invention is linked to the substrate, is stable and long-lasting or permanent, and is immobilized or insolubilized in the substrate. The mineral compound is bound or contained within and on the surface of the substrate, so it may be said to be ingrained in the fibers or matrix of the substrate, or incorporated or embedded within the substrate. The desired effect is preferably a color. A wide variety of metal salts may be used depending on the desired effect. The oxygen source is preferably a peroxide, and the substrate is preferably a cellulose product such as wood, cotton, or paper; leather; or masonry. The invention contemplates methods of treating substrates, treatment kits, and treated products.

This invention satisfies a long felt need for a water-based, non-toxic stain for woods and other substrates that provides a permanent even coloring effect. The invention is in the crowded and mature art of colorants, preservatives, and finishes for wood and other substrates, yet it has not previously been discovered or used.

The wood-stain industry has been searching for ways to reduce toxic chemical use, to more effectively stain woods such as pine that are difficult to work with and relatively inexpensive, and to simulate the appearance of aging. The demand is such that any feasible process tends to be put into use.

This invention succeeds where previous efforts have failed. It avoids the need for volatile organic solvents and toxic compounds, heat, or pressure—elements employed in the prior art—without loss of ability, and indeed with improved results. It can be applied to a wide variety of woods and other substrates with excellent, permanent results. It works quickly in environments and temperatures inappropriate for conventional treatments, and is simple enough to be used by an amateur.

This invention solves previously unrecognized problems, including how to react a substrate with a soluble mineral salt and an oxygen source to color the substrate; how to satisfy consumer aesthetics limiting the substitutability of sustainable woods for endangered species; and how to use a single staining system for a wide variety of wood and non-wood substrates. This invention also solves the problem of evenly staining and rapidly aging soft woods and green woods and related materials, which was generally thought to be insoluble. The advantages provided by the invention could not previously have been appreciated, such as its adaptability to a variety of overcoat finishes, the ability to stain without appreciably raising wood grain, and its retention of the aromatic quality of the substrate.

This invention differs from the prior art in modifications which were not previously known or suggested, such as using mineral salts and peroxide solutions to produce surprising coloring effects. Indeed, this invention is contrary to the teachings of the prior art, which favors one step treatments using colored pigments, rather than two step processes whereby the color is developed and stabilized during the process.

The inventive approach to the coloring and preserving of cellulose and other materials is a process whereby a water-soluble mineral salt is saturated into the substrate material and subsequently oxidized and somehow linked or bonded to that material. This process has no precedent in the marketplace and provides important advantages in both the commercial and consumer markets. In a preferred embodiment, the inventive stains are completely water-based. The process does not require a binder of any kind, petroleum products, organic solvents, acrylic resins, dyes, or other expensive or toxic materials. The component materials have low-impact on both the environment and human heath. The unique characteristics of the product, its permanence even in exterior applications, its ability to evenly stain extremely soft woods and penetrate extremely hard woods, its simulated aging of wood, and the richness of the colors achieved will appeal even to those completely unconcerned about its environmental and health advantages.

According to the invention, a method for coloring a substrate comprises:

(a) applying a preparation of a metal salt to the substrate, and (b) separately applying a preparation of an oxygen source to the substrate, such that the metal salt and the oxygen source penetrate the substrate and react in contact with the substrate to produce a stable, water-insoluble stain or other fixed physical characteristic in the substrate.

Step (a) may be performed before or after step (b), and there may be a step of drying the substrate between the two steps. Preferably the preparations are aqueous solutions and are applied between the freezing point and boiling point of the solutions as determined under the particular process conditions selected for the method. The method may further comprise applying a sealing coat over the substrate surface.

In a preferred embodiment, the substrate is a sustainably harvested wood, the stain is relatively uniform, the metal salt is of low toxicity and not considered hazardous, the reparations of metal salt and oxygen source are water-based solutions, and the oxygen source eaves essentially no residue. Preferably, the metal salt preparation and the oxygen source reparation are aqueous solutions.

The metal salt may be any appropriate mineral salt and is preferably a salt of iron, silver, zinc, cerium, copper, magnesium, molybdenum, nickel, tin, chromium, aluminum, and titanium, or a salt of antimony, beryllium, bismuth, cadmium, cobalt, gold, iridium, lead, manganese, mercury, niobium, osmium, platinum, plutonium, potassium, rhodium, selenium, silicon, sodium, tantalum, thorium, tungsten, uranium, vanadium, or a combination. The principal purpose of staining with the mineral may be to impart a desirable color to the substrate, to preserve the substrate, or both.

The metal salt is preferably selected from sulfates, chlorides, perchlorates, permanganates, thiosulfates, acetates, nitrates, as well as oxides that are subject to reduction to release a metal ion capable of reacting with the oxygen source in the presence of the substrate to produce a color. Other salts that may be suitable include halides, phosphates, carbonates, nitrates, oxalates, silicates, tartrates, formates, chromates, organic salts, and the like, so long as the metal ion or compound is sufficiently soluble to penetrate the substrate and is able to react with the oxygen source preparation to produce the desired color or other desired fixed quality in the substrate.

Preferred metal salts are silver sulfate, iron (II) chloride, zinc perchlorate, cerium (III) perchlorate, iron (II) perchlorate, iron (II) sulfate, silver perchlorate, copper acetate, magnesium nitrate, and cerium nitrate. Other preferred metal salts are molybdenum (VI) oxide, zinc sulfate, copper (II) chloride, nickel perchlorate, nickel sulfate, copper (II) perchlorate, tin (II) sulfate, tin (I) chloride, chromium (III) sulfate, aluminum sulfate, cerium (III) perchlorate, zinc peroxide, titanium hydride, chromium (III) perchlorate, zinc powder in combination with titanium salts, manganese (II) chloride, aluminum chloride, titanium (IV) chloride, silver chloride, and titanium (II) sulfate.

Preferably the oxygen source is a peroxide. It may be hydrogen peroxide, sodium peroxide, zinc peroxide, barium peroxide, calcium peroxide, or lithium peroxide. The oxygen source may include a hydroxide such as sodium hydroxide. The oxygen source is capable of penetrating the substrate and reacting with the metal salt to impart a stable color or other physical characteristic to the substrate.

The substrate is preferably a building material or textile and is preferably a cellulosic material such as a soft wood, hard wood, bamboo, rattan, or other cellulose product, such as cotton, paper, cardboard, or the like. The substrate may be previously coated, such as a latex painted surface. The substrate may be leather, fabric, or porous plastic; or it may be a masonry material such as ceramic, plaster, cement, concrete, stone, brick, or a combination. Preferably the effect achieved in the substrate is a color, typically an earth tone. The substrate is one which can be penetrated and contacted sequentially with the metal salt preparation and the oxygen source preparation so as to produce the desired color or other effect bound stably within the substrate. Preferably the substrate is wood or is a wood-like product, meaning a hard fibrous, cellulose-based product from trees, bamboo, reeds or other agricultural sources, including fiber board, plywood, and veneer.

The metal salt preparation and/or oxygen source preparation may further comprise a compatible additive selected from the group consisting of thickener, alcohol, emulsifier, coloring agent, pigment, dye, bleach, sealer, finishing agent, tint, acrylic finish, latex finish, polyurethane, alcohol, gelling agent, tabletting agent, surfactant, buffer, citric acid, tannic acid, acetic acid, other acid, base, color, salt, stabilizer, antimicrobial, antifungal, insecticide, insect repellant, ultraviolet protectant, and fire retardant. Other additives now known or hereafter available to a person of skill in the art may be employed so long as they do not interfere with the operation of the components of the invention and have suitable shelf life and other characteristics.

The invention contemplates a colored or otherwise altered substrate produced by the method of the invention. The colored or altered substrate, at its surface or within, has a stable manufactured composition that imparts color or other desirable characteristics, the composition comprising the products of a chemical reaction in contact with the substrate, between a metal salt, and an oxygen source.

The invention further contemplates a kit for treating a substrate, comprising (a) a metal salt preparation, and (b) an oxygen source preparation, the preparations being adapted to penetrate the substrate when applied, and both preparations, when applied sequentially in effective amounts, being adapted to react with each other to produce a compound fixed on or in the substrate that is stable, and water-insoluble and imparts a color or other desirable characteristic.

The metal salt preparation is preferably an aqueous solution comprising between about 0.001% and about 20% (w/v) more preferably about 0.025% to about 8% metal salt. The oxygen source preparation is preferably an aqueous solution comprising between about 0.1% and about 50% (w/v) peroxide, more preferably between about 0.3% and about 15%. The concentration of either component may be the point of saturation of a solution or a higher concentration of an appropriate suspension.

Further details, objectives, and advantages will become apparent from a consideration of the following description.

DETAILED DESCRIPTION OF THE PREFERRED EMBODIMENTS

In describing preferred embodiments of the present invention, specific terminology is employed for the sake of clarity. However, the invention is not intended to be limited to the specific terminology so selected, and it is to be understood that each specific element includes all technical equivalents which operate in a similar manner to accomplish a similar purpose. For the sake of simplicity, this description principally addresses application to wood products. In most cases, however, processes and compositions discussed are also applicable to a wide variety of non-wood products.

The inventive process is a two-step process preferably involving a non-toxic, water-based mineral solution and a low toxicity water-based oxidizing solution applied sequentially to unfinished wood products. The process may be adapted for the coloring and finishing of wood-like products such as bamboo or rattan, paper, recycled cellulose products, cotton and other cloths, leather, certain porous plastics, tile, cement, and other masonry, and other substrate substances.

The user first brushes, sprays, or otherwise applies a water-based solution "A" onto a wood or other product, lets the product dry for about 5–30 minutes, depending on temperature and humidity, then applies a second water-based solution "B". Color change begins immediately and when the B solution dries, in another approximately 5–30 minutes, the product is permanently stained. The solutions may also be applied by soaking the substrate in the solution, at standard temperature and pressure or at either extreme or combinations as with typical pressure treatments for lumber to ensure thorough penetration of thicker substrates.

The inventive process can simulate the look of other, generally more expensive woods (i.e. making pine look like maple, alder look like walnut, or bamboo plywood look like oak). In particular, the coloring process can provide stains that simulate increasingly endangered woods such as mahogany, ebony, and redwood.

In another application, the process can be used to give new wood an aged appearance for aesthetic reasons, or to allow the unobtrusive introduction of new wood into antique furniture, architectural antiques, fences or shingles that are in need of refurbishment. In such applications, it may be advantageous to distress the surface with rough sanding, sand blasting, chiselling, saw marks, and so on, to allow the minerals to soak in and provide irregular staining. In other applications, it is preferable to maximize the uniformity of the staining, although the stain tends to be somewhat darker around knots and ring areas even with a smooth surface. Nonetheless, staining according to the invention may be uniform, in the sense that it is more even than conventional water-based stains.

The A solutions contain a variety of mineral salts (such as a variant of the iron-rich compounds found in nutritional supplements) and other natural compounds that soak into the wood surface readily. The B solutions contain an oxidizing agent, such as dilute peroxides similar to the hydrogen peroxide found in many medicine cabinets. Preferred B solutions are somewhat more concentrated.

Although the invention is not intended to be limited to the mechanism of action, it is believed that the oxygen source causes an oxidation reaction, bonding the minerals in solution A to or among the cellulose fibers in the wood, or other matrix material of a substrate, a process referred to here as "crosslinking." The chemical nature of the crosslinking reaction is suggested by the fact that a color change results from the combination of solution A, solution B, and the substrate. The resulting color, unlike the clear solutions and their components, is not water-soluble. Also, typically if solutions A and B are mixed without first applying them to the substrate, they throw an unattractive gray-black or gray-brown sediment which is not useful for staining according to the invention. At high strengths and with peroxides, such a reaction is accompanied by bubbling as oxygen is released from the peroxide.

The process involves saturating the fibers of a wood or other product matrix with a solution of minerals in a water-soluble form and then oxidizing said minerals in the fibers or matrix to change the color, texture, and general appearance of the wood or other properties. It is believed that the coloring process of the invention renders mineral salts into a stable, insoluble form, perhaps an oxide, coordination compound, or other water-insoluble compound or complex, referred to here as a cross linked compound.

The metal salt formulation soaks into the substrate, impregnating it with mineral ions, which are then converted by the oxygen source into an insoluble coloring compound.

Thus, a metal oxide may serve as a metal salt according to the invention, and is contemplated within that definition, if it is solubilized with an acid, applied so as to penetrate into a substrate, and then reacted with an appropriate oxygen source to generate the desired color or other effect. With soluble oxides such as molybdenum IV oxide, the metal oxide may be soaked into the substrate directly, and then reacted to produce a color. Also, solution A may include a combination of a salt of one metal such as titanium chlorate and an elemental metal, such as zinc powder, such that the elemental metal is oxidized by the salt to produce a metal salt which then reacts according to the invention.

The coloring agent according to the invention may associate physically or chemically with the substrate, via absorption, mechanical admixture, entrapment, polar attraction, or covalent bonding. With cellulosic and leather products, it is assumed that the reaction involves the cellulose or collagen matrix of the substrate article, although it would not affect the scope of the invention if the colored compound remains physically trapped in the matrix of such substrates, without reacting chemically with them. With masonry, the substrate may or may not react with the metal salt and oxygen source, so long as the colored compound is fixed insolubly within the substrate. The scope of the invention is not intended to be limited to any of these supposed mechanisms of action, however.

The invention also encompasses methods and compositions for imparting other desired stable physical effects to a substrate, where color may be a secondary factor. For example, with certain combinations of metal salts and oxygen sources, the substrate may have an improved texture, conductivity, photosensitivity, anti-fungal, antimicrobial, insect repellant, or fire retardant quality, as a result of treatment according to the invention. Thus the scope of the intention may encompass a method for imparting a desirable stable physical change by sequentially applying preparations A and B to the substrate and allowing them to react so as to fix or bond the reaction product to or within the substrate.

In some cases, the B solution is applied before the A solution in order to obtain a different effect. Different mineral solutions and different oxidizing agents create markedly different effects on wood, and these finishes can be customized for specific application to a wide variety of materials.

The invention relates to compositions and kits comprising the various A and B solutions prepared by combining water soluble or other mineral salts, oxidizing agents, and other substances into an aqueous solution.

The product has a variety of commercial applications including: wood stain, as an alternative to petroleum, acrylic, and latex wood finishes; a wood aging system, to make new wood take on the appearance of old wood; stain for wood-like products, to color and preserve wood-like products such as bamboo; cloth stain, to color cloth, hemp, flax, textiles, leather, and other similar products; wood or other substrate preservation through anti-microbial or anti-fungicidal effects; and masonry stain: to color tile, cement, concrete, brick, stone, and other similar products. The invention can be used both indoors and outdoors, for wood and non-wood products. As can be appreciated, the metal salt can be selected to provide desirable preservative, antifungal, and/or insecticidal properties in addition to a color effect, or can be combined with known preservative treatments. In some applications, the color may be secondary to the ability of the oxygen source to bind or link the metal ion into the substrate according to the two step process of the invention.

A kit according to the invention can be distributed in two containers such as plastic bottles, one for the A solution and one for the B solution. Bottles A and B can preferably contain a concentrated solution of key mineral salts or oxidizing agents dissolved in water, which the end-user will dilute in a gallon or other volume of water. Alternatively, the product may be distributed in powder or tablet form, requiring the end-user to dilute fully with water. The product can be distributed in fully diluted liquid form, ready to use, which increases shipping costs but reduces variability due to the type of water used and dilution techniques. These decisions can readily be made by a person of ordinary skill depending on acceptance of the various techniques among consumers (such as professional or amateur markets) and the relative difficulty of maintaining certain chemicals' shelf lives in aqueous versus dry conditions. Preferred formulas make use of only non-toxic substances such as iron and silver sulfates and avoid toxic heavy metals such as chromium, cobalt, and lead, which minimize regulatory oversight, and shipping, labelling, and disposal requirements.

Preferred applications involve water-soluble solutions of minerals of low toxicity, usually in the form of mineral salts such as iron chloride in the A solution, and sodium peroxide or hydrogen peroxide as the oxygen source in the B solution. More toxic metals may also be used for an appropriate result, although they require additional precautions in handling and disposal. Other oxygen sources may be used, and the invention may be carried out in preparations other than water or aqueous solutions. For example, a gel, paste, emulsion, or other thick preparation may be used for either or both components, so long as such a formulation is able to deliver the metal salt and oxygen source into the substrate in a reactive form. Typically, such a thick preparation would be an aqueous solution, although an emulsion with an oil or a suspension may be appropriate in certain applications.

In a preferred embodiment, to form the various preparations of Solution A, a measured weight of the mineral or minerals is mixed in a volume of purified water. To form the iterations of Solution B, liquid hydrogen peroxide or powdered sodium peroxide are mixed in a volume of water. Alternatively, sodium hydroxide is added to a hydrogen peroxide solution and may be neutralized or buffered if desired. Certain other compounds may serve as an oxygen source according to the invention, such as citric acid on other organic and inorganic acids, provided that they react with an appropriate metal salt according to the invention in contact with the substrate to produce the desired effect.

The first step in applying the mineral stain is to apply a sufficient amount of Solution A onto the wood or other substrate so that it penetrates, using a brush, pad, roller, spraying device or other suitable method. The solution is generally clear, translucent or slightly cloudy, and alters the color of wood much the same way the application of water would. Some of the A solutions are orange or pink, some milky, some gray. When applied, however, in thin coatings, there is no appreciable color until the oxygen source is applied. Optionally colorants, thickeners, surfactants, and other additives may modify the appearance of the A solution. When the Solution A dries, in 5–30 minutes depending on temperature and humidity etc., the wood looks much as it did before anything was applied to it. A slight graying may be apparent.

The next step is to apply Solution B to the wood or substrate in much the same manner as Solution A. With a strong Solution B, the color in the wood changes immediately. With weaker solutions, the color comes on slowly, over five minutes or so. The process is reminiscent of making photographic film prints, or watching an instant photograph develop, or making invisible ink become visible. Strong iterations of Solution B have a greater tendency to show brush marks, which can be a negative or positive, depending on the effect desired. The final depth of color in the stained wood is more dependent on the concentration of minerals in Solution A.

It is possible, in addition to mixing two or more mineral salts in an A solution or two peroxides in the B, to apply first one and then another A, or first a hydrogen peroxide-based and then a sodium peroxide-based B solution. Thus two basic steps of the process might, for certain effects, such as highlighting raised areas with a different color, etc. involve more than two steps.

The color and tone of the varying wood samples discussed below are described in words but the visual impression of two different samples of wood treated with two different formulas might both be described as "gray brown" though they actually create quite different nuances of visual impression. The colors produced according to the invention are generally earth tones, by which is meant the palate relating to brown, including gray, orange, yellow, red, green and blue variants, ranging from light to virtually black. Opalescent or iridescent effects may be achieved. Brighter coloring effects may also be achieved, as with aluminum oxides. Gray is a preferred effect for simulated aging. The effects may be modified by distressing the surface of the wood to simulate an aged appearance, or by adding pigments and other coloring agents.

The following mineral salts and oxides have been used according to the invention to stain wood: barium sulfate, calcium sulfate, cerium III nitrate, cerium III perchlorate, copper II nitrate, copper II acetate, copper II carbonate dihydroxide, copper sulfate, iron II sulfate, iron II perchlorate, iron II chloride, sodium thiosulfate, magnesium thiosulfate, potassium thiosulfate, potassium nitrate, potassium permanganate, silver sulfate, silver perchlorate, silver nitrate, titanium III sulfate, and zinc perchlorate.

Other mineral salts that may be used according to the invention include: aluminum potassium sulfate, molybdenum (VI) oxide, zinc sulfate, copper (II) chloride, nickel perchlorate, nickel sulfate, copper (II) perchlorate, tin (II) sulfate, tin (I) chloride, chromium (III) sulfate, aluminum sulfate, titanium hydride, chromium (III) perchlorate, zinc powder, manganese (II) chloride, aluminum chloride, titanium (IV) chloride, silver chloride, and titanium (II) sulfate.

Other minerals capable of reacting with an oxygen source in contact with a substrate to color the substrate or provide other effects according to the invention may be selected from salts of elements of columns 2 through 6 of the Periodic Table of the Elements, including the transition elements, Lanthanides, and Actinides. Preferably, the metal is selected from aluminum, antimony, beryllium, bismuth, cadmium, chromium, cobalt, copper, gold, iridium, lead, magnesium, manganese, mercury, molybdenum, nickel, niobium, osmium, platinum, plutonium, potassium, rhodium, selenium, silicon, silver, sodium, tantalum, thorium, tin, titanium, tungsten, uranium, vanadium, and zinc.

As applied to wood and other substrates, the invention may employ any water-soluble mineral salt or oxidized mineral compound soluble in solvents such as acids, alcohols, or other aqueous substances. It may employ any oxidized mineral compounds capable of reacting with an oxygen source and a substrate to form a colored compound linked to the substrate. Such compounds are referred to here collectively for convenience as metal salts, although some of the mineral elements are not metal, and some of the compounds are oxides, not salts.

The oxygen source may be any oxidizing agent capable of oxidizing mineral salts according to the invention in the presence of a substrate of wood, bamboo, leather, cellulose, and other suitable substrates. Preferred oxygen sources are peroxides, compounds that include the peroxy (—O—O—) group. Peroxides form hydrogen peroxide upon solution in water. The invention may employ any inorganic or organic peroxide, including those described in Kirk Othmer, *Concise Encyclopedia of Chemical Technology*, pp. 845–850 (1985), which is incorporated herein by reference. Thus, the oxygen source may be a superoxide or ozonide, or a peroxyacid. It may also be a hypochlorite or chlorine dioxide, although these are relatively toxic and unstable.

A person of ordinary skill may vary and control for the following parameters to obtain a desired result. The color-producing reactions and resultant color and textural appearance of the wood varies widely with the different minerals used in Solution A. They are reproducible, however, and may be selected as desired to provide a particular appearance. The effect may vary with the purity of the minerals used in Solution A. The examples below used Reagent Grade but Technical Grade or lower grades are suitable for a commercial application.

The effect varies with the oxygen sources in solution B. Sodium peroxide and hydrogen peroxide and combinations give desirable effects. Other inorganic and organic peroxides and oxygen sources are suitable.

The effect may vary with the source of water. The examples use purified water. Distilled water versus mineral-rich well water may result in slightly different effects. In general, however, the use of tap water or deionized water gives adequate results. In other cases, modifying the pH or ionic strength with additives may be desirable.

The effect may vary with the solution in which the minerals or peroxides are dissolved or suspended. In the examples below, water is used, but other liquids could be used, some with non-water-soluble minerals. Instead of a solution, the minerals could be dissolved or suspended in a gel, wax, lotion, or creme and rubbed into the wood or substrate, so long as adequate penetration results. The wood or substrate must also be susceptible to penetration by an appropriate oxygen source, and the vehicle must be compatible in that it does not interfere with the color-producing reaction.

The effect may vary with the concentrations of the solutions. Generally, more dilute solutions create lighter color density but in some cases they actually give the appearance of a different color.

The effects produced do not vary appreciably with the ambient temperature at which the solutions are applied. The process can be followed at any temperature above or even slightly below 32° F. or the freezing point, and the stained wood is dry and ready to be top-coated (if desired) in less than an hour, depending on humidity and temperature conditions. For extremely low-temperature applications, minerals and/or oxidizing agents can be dissolved in alcohol or other non-water solutions. In the examples below, the tests took place at room temperature, but experiments at near-freezing temperatures seemed to create the same result. The invention can also be applied at upper extremes of temperature or high or low pressure, if appropriate.

Reactions and resultant color and textural appearance of the substrate vary with the substrate material. In the examples below, sugar pine was used but the method of the invention has been successfully applied to northern pine, ponderosa pine, alder, poplar, maple, oak, ash, cedar cherry, walnut, obinji and other woods and, of course, the results vary widely with the color, tone, and character of each type of wood. Successful demonstrations have also been done on ply bamboo, cotton, leather, and masonry. Ply bamboo is a very hard wood product, does not stain well with conventional products but is susceptible to coloring according to the invention. Other substrates are suitable so long as they are made of a material capable of binding the mineral salt in the presence of the oxygen source according to the invention.

Effects may vary with the order of application of solutions A and B. In general, starting with B and finishing with A yields a similar color but less nuances of wood grain, which could be preferable in certain applications. In simulating aged wood, for example, the A solution should be applied first. For a non-aged appearance and an even color, the B solution can be applied first. It may be that applying B first makes for a more superficial penetration of the linked color in the wood, but this may be appropriate for thin substrates. With porous substrates, such as fabric or leather, it is preferable to soak the substrate in the solutions to ensure even staining.

The results also vary with the additives included in solutions A or B such as pigments or dyes, citric acid, bleaches, alcohols, solvents, thickeners, tableting agents, finishing agents such as an appropriate overcoat of acrylic and other resins or polyurethanes that might oxidize and seal the wood simultaneously. Alternatively, an over coat sealer may be applied over the stain. An overcoat may optionally be included into Solution B (or solution A if that is applied last).

Stained wood according to the invention has been subjected to accelerated weathering situations, exposure to sun, hot water, freezing temperatures, and submersion in water. It is resistant to fading and actually is made slightly darker or warmer in tone on exposure. These tests show that the product produces a remarkably permanent stain suitable for use by professionals and amateurs, for interior and exterior application.

EXAMPLES

In all the formulas below, Solution A is made up as a solution of mineral in water. Concentrations are given as percent (weight/volume), or the number of grams of mineral and the volume of water is given. Solution B is made up of a 15% (v/v) solution hydrogen peroxide or a 0.3% sodium peroxide solution (made from 3.0 grams per liter of water). In all these cases, the substrate is Sugar Pine unless specifically mentioned otherwise. Different woods or other substrates work equally well, but the colors are somewhat different. These experiments were conducted with an ambient temperature around 65–75 degrees F. Upon application of the B solution, color appeared in from less than one second to up to one minute. Experiments at different temperatures have only marginally different results. Different strengths of Solution B speed or slow the reaction, but result in similar end colors. The key variable determining the color is the mineral or minerals in Solution A. In Examples 1–10, the given mass of mineral was dissolved in 1 liter water.

Example 1

Solution A: 0.25 g Silver Sulfate ($Ag_2SO_4$)
Solution B: Sodium Peroxide
Result: Medium density golden-brown Example 2

Solution A: 2.0 g Iron (II) Chloride ($FeCl_2.H_2O$)+0.5 g Silver Sulfate ($Ag_2SO_4$)
Solution B: Sodium Peroxide
Result: Medium density gray-brown, aged appearance
Solution B: Hydrogen Peroxide
Result: Medium density warm yellow-brown Example 3

Solution A: 1.5 g Iron (II) Chloride
Solution B: Hydrogen Peroxide
Result: Light density warm brown with reddish tone Example 4

Solution A: 1.5 g Iron (II) Chloride+1.0 g Zinc Perchlorate ($Zn(ClO_4)_2.6H_2O$)
Solution B: Hydrogen Peroxide
Result: Medium density orange-brown with dark brown to black highlights in the crossgrain
Solution B: Sodium Peroxide
Result: Medium density gray with black in the crossgrain Example 5

Solution A: 1.5 g Cerium III Perchlorate ($Ce(ClO_4)_3.6H_2O$)
Solution B: Hydrogen Peroxide
Result: Light to medium density yellow-brown Example 6

Solution A: 2.0 g Iron (II) Perchlorate ($Fe(ClO_4)_2.6H_2O$)
Solution B: Hydrogen Peroxide
Result: Light to medium density warm brown, aged appearance Example 7

Solution A: 2.0 g Iron (II) Perchlorate ($Fe(ClO_4)_2.6H_2O$)+ 0.25 g Silver Sulfate ($Ag_2SO_4$)
Solution B: Hydrogen Peroxide
Result: Medium density warm brown aged appearance
Solution B: Sodium Peroxide
Result: Medium density gray brown aged appearance Example 8

Solution A: 1.5 g Iron (II) Sulfate ($FeSO_4.7H_2O$)
Solution B: Hydrogen Peroxide
Result: Medium density warm brown, aged appearance
Solution B: Sodium Peroxide
Result: Medium density warm gray Example 9

Solution A: 0.5 g Silver Perchlorate ($AgClO_4.H_2O$)
Solution B: Sodium Peroxide
Result: Medium density warm brown, aged appearance

Example 10

Solution A: 1.0 g Iron (II) Sulfate+0.5 g Silver Perchlorate
Solution B: Hydrogen Peroxide
Result: Medium density warm brown, aged appearance
Solution B: Sodium Peroxide
Result: Medium density gray brown aged appearance

Example 11

Solution A: Copper Acetate, 1 gram diluted in 50 ml of $H_2O$
With Hydrogen Peroxide: warm orange-brown, medium density
With Sodium Peroxide: no reaction

Example 12

Solution A: Iron(II) Chloride: 0.5 grams and Silver Sulfate 0.5 grams in 50 ml $H_2O$
With Hydrogen Peroxide: gray-brown, medium density
With Sodium Peroxide: orange brown, dark density

Example 13

Solution A: Iron (II) Perchlorate: 8 grams and Silver Sulfate 0.25 grams in 100 ml $H_2O$
With Hydrogen Peroxide: dark aged appearance
With Sodium Peroxide: nearly black, ebony-like appearance

Example 14

Solution A: Iron (II) Perchlorate: 4 grams and Silver Sulfate 0.1 grams in 100 ml $H_2O$
With Hydrogen Peroxide: warm orange brown, medium density
With Sodium Peroxide: warm reddish brown, medium density

Example 15

Solution A: Iron (II) Perchlorate 4 grams and Silver Sulfate 0.1 grams in 200 ml $H_2O$
With Hydrogen Peroxide: warm gray aged appearance, light density
With Sodium Peroxide: reddish gray aged appearance, light density

Example 16

Solution A: Iron (II) Chloride 2.5 grams and Silver Sulfate 0.5 grams in 150 ml $H_2O$
With Hydrogen Peroxide: minimal reaction
With Sodium Peroxide: gray-black with silvery sheen, dark density
With Sodium Peroxide and Hydrogen Peroxide mixed together: warmer gray-black with reddish tinge, dark density

Example 17

Solution A: Iron (II) Perchlorate 1 gram in 200 ml $H_2O$
With Hydrogen Peroxide: gray brown aged appearance, light density
With Sodium Peroxide: orange brown aged appearance, light density

Example 18

Solution A: Iron (II) Chloride 1 gram in 200 ml $H_2O$
With Hydrogen Peroxide: gray brown aged appearance, light to medium density
With Sodium Peroxide: richer brown aged appearance, light to medium density

Example 19

Solution A: Iron (I) Chloride 1 gram in 400 ml $H_2O$
With Hydrogen Peroxide: gray brown aged appearance, light density
With Sodium Peroxide: warm brown aged appearance, light density

Example 20

Solution A: Magnesium Nitrate 1 gram in 250 ml $H_2O$
With Hydrogen Peroxide: minimal result
With Sodium Peroxide: yellow appearance, medium density

Example 21

Solution A: Cerium Nitrate 1 gram in 250 ml $H_2O$
With Hydrogen Peroxide: minimal result
With Sodium Peroxide: yellow appearance, medium density In all of the examples below the hydrogen peroxide is in a 15% solution and the Sodium Peroxide is made with 2 grams diluted in one liter $H_2O$.

Example 22

Silver Perchlorate: 1.5 grams per liter $H_2O$
Result on concrete:
With Hydrogen Peroxide: no effect
With Sodium Peroxide: gun metal gray to black

Example 23

Iron (II) Chloride: 2 grams per liter $H_2O$ result with cotton cloth:
With Hydrogen Peroxide: light gray
With Sodium Peroxide: orange brown

Example 24

Iron (II) Chloride: 2 grams per liter $H_2O$
result on pale unfinished leather:
With Hydrogen Peroxide: warm golden brown
With Sodium Peroxide: grayish tan

Example 25

Iron (II) Chloride: 2 grams per liter $H_2O$
result on paper:
With Hydrogen Peroxide: light gray
With Sodium Peroxide: rich sepia The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. A method for treating a wood substrate comprising the steps of:
   (a) contacting the wood substrate with a first aqueous solution comprising a metal salt solution, said metal salt selected from the group consisting of gold, platinum, vanadium and cerium, or combinations thereof; and
   (b) contacting the wood substrate with a second aqueous solution comprising an oxidizing agent solution, wherein said oxidizing agent is a peroxide and wherein said first and second solutions are contacted with the substrate for a sufficient time to stain the substrate.

2. The method of claim 1, wherein the oxidizing agent is selected from hydrogen peroxide, sodium peroxide, zinc peroxide, calcium peroxide, barium peroxide and lithium peroxide.

3. The method of claim 1, wherein the second aqueous solution further comprises tannic acid.

4. The method of claim 1, wherein the metal salt is a gold salt.

5. The method of claim 1, wherein the metal salt is a platinum salt.

6. The method of claim 1, wherein the metal salt is a vanadium salt.

7. The method of claim 1, wherein the metal salt is a cerium salt.

8. The method of claim 1, wherein the metal salt is selected from the group consisting of sulfates, chlorides, perchlorates, acetates, nitrates, permanganates, thiosulfates, and oxides, and combinations.

9. The method of claim 1, wherein the metal salt is selected from the group consisting of, cerium (III) perchlorate and, cerium nitrate, and combinations thereof.

10. The method of claim 1, wherein the metal salt solution is at a concentration between about 0.001% and about 20%.

11. The method of claim 1, wherein the metal salt solution is at a concentration between about 0.025% and about 8%.

12. A method for treating a wood substrate consisting of:
    (a) contacting the wood substrate with a first aqueous solution comprising a metal salt solution, said metal salt selected from the group consisting of titanium, gold, platinum, vanadium and cerium, or combinations thereof; and
    (b) contacting the wood substrate with a second aqueous solution comprising an oxidizing agent solution, wherein said oxidizing agent is a peroxide and wherein said first and second solutions are contacted with the substrate for a sufficient time to stain the substrate.

13. The method of claim 12, wherein the oxidizing agent is selected from hydrogen peroxide, sodium peroxide, zinc peroxide, calcium peroxide, barium peroxide and lithium peroxide.

14. The method of claim 12, wherein the second aqueous solution further comprises tannic acid.

15. The method of claim 12, wherein the metal salt is a titanium salt.

16. The method of claim 12, wherein the metal salt is a gold salt.

17. The method of claim 12, wherein the metal salt is a platinum salt.

18. The method of claim 12, wherein the metal salt is a vanadium salt.

19. The method of claim 12, wherein the metal salt is a cerium salt.

20. The method of claim 12, wherein the metal salt is selected from the group consisting of sulfates, chlorides, perchlorates, acetates, nitrates, permanganates, thiosulfates, and oxides, and combinations.

21. The method of claim 12, wherein the metal salt is selected from the group consisting of titanium III sulfate, titanium hydride, cerium (III) perchlorate, titanium (IV) chloride, titanium (II) sulfate, and cerium nitrate, and combinations thereof.

22. The method of claim 12, wherein the metal salt solution is at a concentration between about 0.001% and about 20%.

23. The method of claim 12, wherein the metal salt solution is at a concentration between about 0.025% and about 8%.

* * * * *